US011865765B2

(12) United States Patent
Lim

(10) Patent No.: US 11,865,765 B2
(45) Date of Patent: Jan. 9, 2024

(54) 3D FORMING FILM MANUFACTURING DEVICE AND 3D FORMING FILM MANUFACTURING METHOD USING SAME

(71) Applicant: REALOOK & COMPANY CORP., Yongin-si (KR)

(72) Inventor: Namil Lim, Suwon-si (KR)

(73) Assignee: REALOOK & COMPANY CORP., Yongin-si (KR)

( * ) Notice: Subject to any disclaimer, the term of this patent is extended or adjusted under 35 U.S.C. 154(b) by 280 days.

(21) Appl. No.: 17/059,159

(22) PCT Filed: Nov. 13, 2018

(86) PCT No.: PCT/KR2018/013853
§ 371 (c)(1),
(2) Date: Nov. 25, 2020

(87) PCT Pub. No.: WO2020/096104
PCT Pub. Date: May 14, 2020

(65) Prior Publication Data
US 2021/0197440 A1    Jul. 1, 2021

(30) Foreign Application Priority Data

Nov. 5, 2018  (KR) .......................... 10-2018-0134650

(51) Int. Cl.
*B29C 51/20*  (2006.01)
*B29C 51/28*  (2006.01)
(Continued)

(52) U.S. Cl.
CPC ............ *B29C 51/087* (2013.01); *B29C 51/20* (2013.01); *B29C 51/40* (2013.01); *B29C 51/427* (2013.01); *B29L 2007/002* (2013.01)

(58) Field of Classification Search
CPC . B29C 51/20; B29C 51/427; B29C 2043/364; B29C 51/087
See application file for complete search history.

(56) References Cited

U.S. PATENT DOCUMENTS 4,157,884 A * 6/1979 Andrae ................... B29C 51/36
425/173
4,475,976 A * 10/1984 Mittelstadt ............ B29C 70/541
425/389

(Continued)

FOREIGN PATENT DOCUMENTS

KR    10-2006-0080749 A    7/2006
KR    10-2009-0100055 A    9/2009
(Continued)

OTHER PUBLICATIONS

Automating cutting of composites, Reinforced Plastics (Jun. 2008), pp. 20-25. (Year: 2008).*

*Primary Examiner* — Matthew J Daniels
(74) *Attorney, Agent, or Firm* — Bridgeway IP Law Group, PLLC; Jihun Kim

(57) ABSTRACT

A device for manufacturing a 3D forming film performs molding at a uniform pressure by using a variable volume body, and thus, enables undercut portion molding, prevents thermal corrugation on the curved portion, etc., of the forming film and the distortion of the forming film, reduces a thickness deviation of the forming film and excludes an additional cutting process after molding the forming film, thereby improving the quality of the 3D-molded forming film. The device for manufacturing the 3D forming film includes: a mold for molding a forming film; a press head unit which is positioned to correspond to the mold and has a variable spaced distance from the mold; and a variable volume body which is coupled to the press head unit and has (Continued)

elasticity so that a volume thereof is variable due to gas introduction and discharge by the press head unit.

13 Claims, 19 Drawing Sheets

(51) Int. Cl.
*B29C 51/08* (2006.01)
*B29C 51/40* (2006.01)
*B29C 51/42* (2006.01)
*B29L 7/00* (2006.01)

(56) References Cited

U.S. PATENT DOCUMENTS

| | | | |
|---|---|---|---|
| 9,511,550 B2 * | 12/2016 | Mine | B29C 43/52 |
| 2009/0177306 A1 * | 7/2009 | Bosga | B30B 15/148 |
| | | | 901/6 |
| 2010/0102482 A1 * | 4/2010 | Jones | B29C 43/58 |
| | | | 264/320 |

FOREIGN PATENT DOCUMENTS

| | | |
|---|---|---|
| KR | 10-2010-0083374 A | 7/2010 |
| KR | 10-2010-0092674 A | 8/2010 |
| KR | 10-2010-0100381 A | 9/2010 |
| KR | 10-1266375 A | 5/2013 |

* cited by examiner

3D FORMING FILM MANUFACTURING DEVICE AND 3D FORMING FILM MANUFACTURING METHOD USING SAME

FIELD

The present invention relates to a device for manufacturing a 3D forming film and a method for manufacturing a 3D forming film using the same, and more particularly to a device for manufacturing a 3D forming film, which performs molding at a uniform pressure by using a variable volume body, and thus, enables undercut portion molding and reduces a thickness deviation of the forming film, thereby improving the quality of the 3D-molded forming film.

DESCRIPTION OF THE RELATED ART

A forming film is mainly formed of a polymer material. In the case of performing molding on the forming film according to a prior art, the molding range is limited due to spring back of the forming film. Also, when the forming film is molded into a 3D shape, thermal corrugation occurs or mold damage occurs.

Also, in the case of using hot press in a molding method of a prior art, the undercut portion of the forming film cannot be molded and there may occur either deformation by heat or thickness deviation after molding. Also, the forming film may be distorted. Due to pin-holes around the forming film, which is used to prevent the distortion of the forming film and to adjust the focus of the forming film, an additional cutting process is required the forming film after molding.

In the case of a ribbling molding among the molding methods of the prior art, the forming film is elongated only by air, so that a whitening phenomenon occurs in the forming film during the molding process.

Korean patent No. 10-1266375 (title of the invention: forming apparatus and forming method using the same) discloses a forming apparatus. The forming apparatus includes a forming unit which has a mold for forming a film in a predetermined shape by heat-pressing, and an air unit for supplying air to the mold when the forming unit performs the pressing. The forming unit includes: a film stack portion where a plurality of films are stacked; a film separator for extracting a piece of the film from the film stack portion; a film supplier for moving the separated piece of the film to the forming unit; and a film discharger for discharging the formed film to the outside from the forming unit. The forming unit further includes a film transfer unit which is operated by a compressor. The air unit is provided with air from the compressor of the film transfer unit.

PRIOR ART DOCUMENT

Korean Patent No. 10-1266375

SUMMARY

Technical Problem

The purpose of the present invention is to enable the molding of the undercut portion which is not easy to implement with conventional molding methods.

The purpose of the present invention is to prevent thermal corrugation on the curved portion, etc., of the forming film.

The purpose of the present invention is to reduce a thickness deviation of the forming film.

The purpose of the present invention is to prevent, during the molding of the forming film, the distortion of the forming film and to exclude an additional cutting process after molding.

The purpose of the present invention is to prevent a whitening phenomenon by the elongation of the forming film when the forming film is molded.

The technical problem to be overcome in this document is not limited to the above-mentioned technical problems. Other technical problems not mentioned can be clearly understood from those described below by a person having ordinary skill in the art.

Technical Solution

One embodiment is a device for manufacturing a 3D forming film. The device includes: a mold for molding a forming film; a press head unit which is positioned to correspond to the mold and has a variable spaced distance from the mold; and a variable volume body which is coupled to the press head unit and has elasticity so that a volume thereof is variable due to gas introduction and discharge by the press head unit. The variable volume body comes into contact with the forming film positioned in the mold in accordance with a volume change of the variable volume body. The variable volume body presses the forming film so that the forming film is mold in a 3D shape. The press head unit may include a gas controller which causes gas transferred from the outside to be introduced into the variable volume body or causes gas inside the variable volume body to be discharged.

The press head unit may further include: a press frame; an up-and-down moving body which is coupled to the press frame and performs an up-and-down linear motion; a press motor which is coupled to the up-and-down moving body; a screw shaft which has an end thereof coupled to the motor and the other end thereof coupled to an upper portion of the gas controller and is screw-coupled to the press frame to perform a rotational motion and an up-and-down linear motion; and a press head of which an upper portion thereof is coupled to the gas controller and of which a lower portion thereof is coupled to the variable volume body.

The device may further include an adsorption bed which fixes the forming film by using an adsorption force and include a film alignment unit which aligns the forming film.

The device may further include a pick-up unit which transfers the forming film to the film alignment unit.

The device may further include a pick-up cooling unit which transfers the forming film after molding and cools the forming film after molding in the mold.

The device may further include a first collector where the punched forming film is moved and collected.

The device may further include a second collector where the forming film after molding is moved and collected.

The device may further include a clamp unit which is installed adjacent to the mold and fixes and supports the forming film when the forming film is located in the mold.

The device may further include a heating unit which is located under the mold and heats the mold.

The device may further include a height adjuster which is connected to one side of the mold or the press head unit and adjusts an up and down position of the mold or the press head unit.

The height adjuster applies pressure to the forming film by adjusting only the up and down position of one of the mold and the press head unit, or applies pressure to the forming film by adjusting the up and down positions of both the mold and the press head unit.

It is preferable that the variable volume body is formed such that it expands partially by introducing a portion of the gas before contacting the forming film and then contacts the forming film, and expands by introducing the remaining gas after contacting the forming film so that the mold and a curved portion of the forming film are pressed and 3D-molded.

Another embodiment is a method for manufacturing a 3D forming film. The method includes: a) providing a 3D shape data for a production target and changing the 3D shape data into a 2D data; b) transferring the forming film formed by punching a raw material film by the 2D data to an adsorption bed from a first collector by a first pick-up part; c) aligning the forming film on the adsorption bed by the film alignment unit; d) transferring the forming film onto the mold by the first pick-up part; e) molding the forming film by a process in which the volume of the variable volume body increases and the press head descends and then the variable volume body presses the forming film on the mold heated by a heating unit; f) cooling the forming film after molding, by a process in which the head press ascends while the volume of the variable volume body decreases and then a second pick-up part moves onto the mold; and g) moving the forming film after molding from the mold to a second collector by the second pick-up part.

Advantageous Effects

By using the mold where the spring back value is attenuated by the physical property of the forming film, it is possible to easily mold the forming film appropriate for a 3D shape having various curved shapes.

The undercut portion can be molded by molding with uniform pressure by using the variable volume body.

Thermal corrugation can be prevented on the curved portion, etc., of the forming film.

The quality of the forming film after molding can be improved by reducing the thickness deviation of the forming film.

The distortion of the forming film is prevented and an additional cutting process after molding is excluded. Also, pin holes formed in the film in order to fix the film are excluded, so that defective rate is decreased and productivity is improved.

Also, appropriate temperature, pressure, and time, etc., can be controlled during molding by the variable volume body. Accordingly, when the forming film is molded, a whitening phenomenon by the elongation of the forming film can be prevented.

The effect of the present disclosure is not limited to the above effects and should be construed as including all the effects that can be inferred from the configuration of the present disclosure disclosed in the detailed description or claims of the present disclosure.

DETAILED DESCRIPTION

Figure 1:
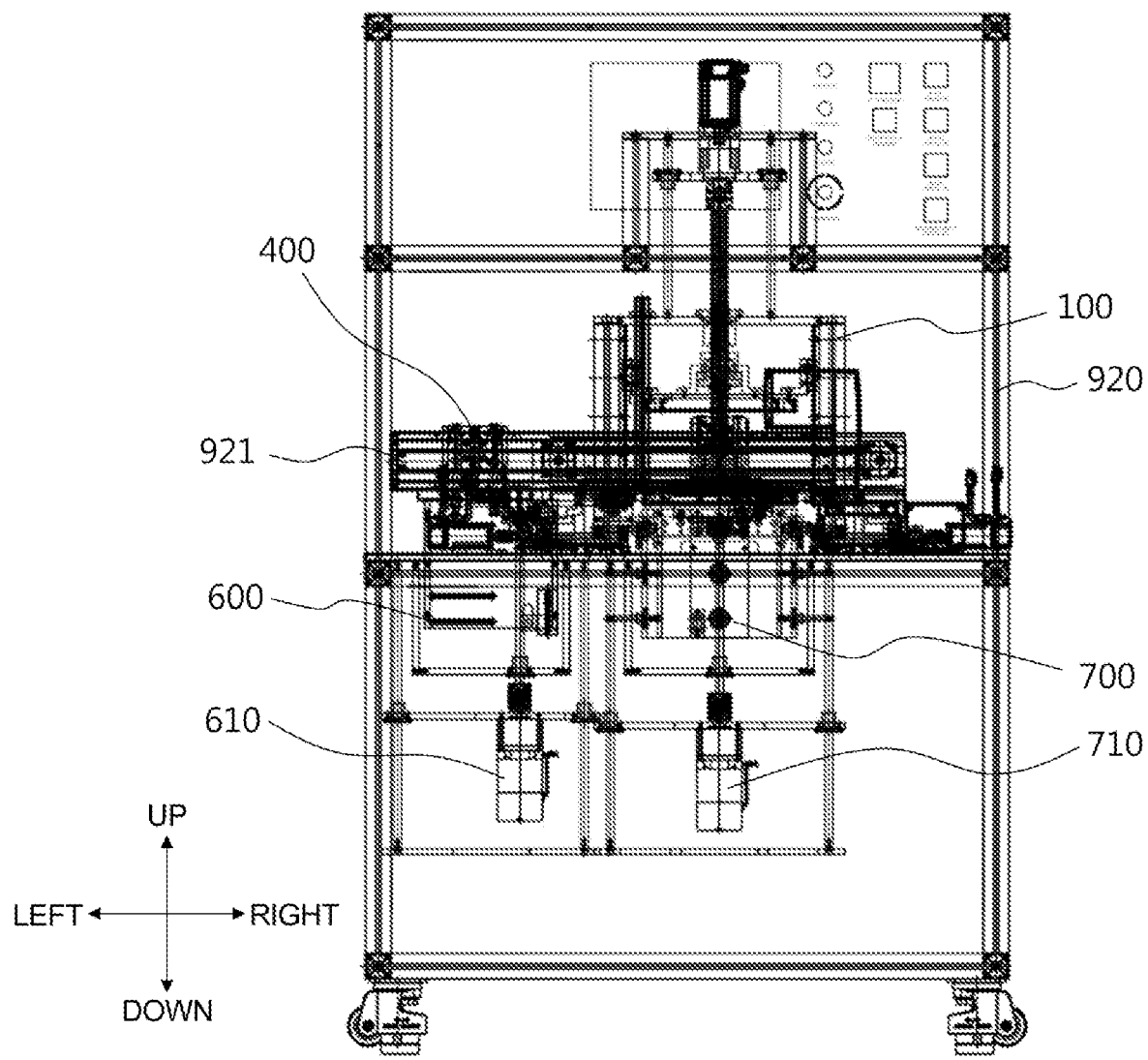
FIG. 1 is a front view of a manufacturing device according to an embodiment of the present invention.

According to the most preferable embodiment of the present invention, a device for manufacturing a 3D forming film includes: a mold for molding a forming film; a press head unit which is positioned to correspond to the mold and has a variable spaced distance from the mold; and a variable volume body which is coupled to the press head unit and has elasticity so that a volume thereof is variable due to gas introduction and discharge by the press head unit. The variable volume body comes into contact with the forming film positioned in the mold in accordance with a volume change of the variable volume body. The variable volume body presses the forming film so that the forming film is mold in a 3D shape.

Hereinafter, the present disclosure will be described with reference to the accompanying drawings. However, the present disclosure may be embodied in various forms and is not limited to the embodiment described in the present specification. In the drawings, parts irrelevant to the description will be omitted for a clear description of the present disclosure. Similar reference numerals will be assigned to similar parts throughout this patent document.

Throughout the specification, when it is mentioned that a portion is "connected (accessed, contacted, combined)" to another portion, it includes not only "is directly connected" but also "indirectly connected" with another member placed therebetween. Additionally, when it is mentioned that a portion "includes" a component, it means that the portion does not exclude but further includes other components unless there is a special opposite mention.

Terms used in the present specification are provided for description of only specific embodiments of the present invention, and not intended to be limiting. An expression of a singular form includes the expression of plural form thereof unless otherwise explicitly mentioned in the context. In the present specification, it should be understood that the term "include" or "comprise" and the like is intended to specify characteristics, numbers, steps, operations, components, parts or any combination thereof which are mentioned in the specification, and intended not to previously exclude the possibility of existence or addition of at least one another characteristics, numbers, steps, operations, components, parts or any combination thereof.

Hereinafter, the embodiments of the present invention will be described in detail with reference to the accompanying drawings.

Figure 2:
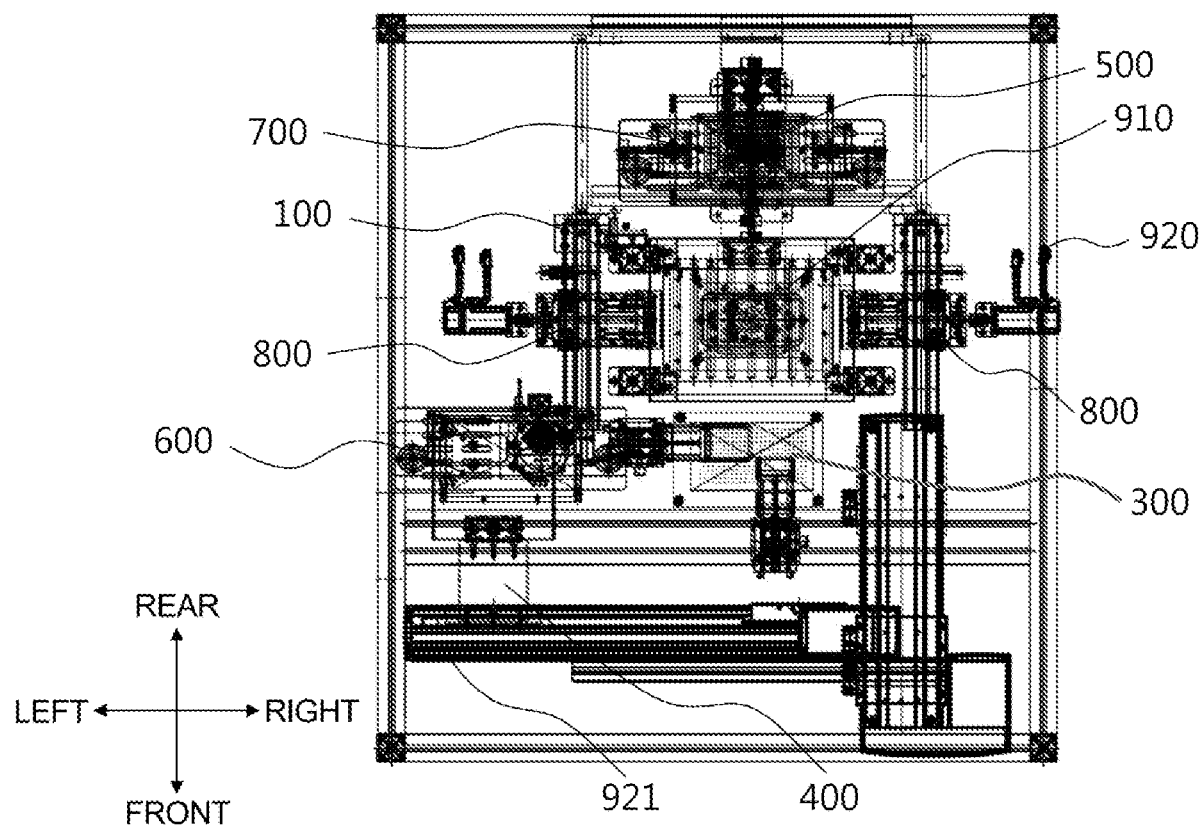
FIG. 2 is a plan view of the manufacturing device according to the embodiment of the present invention.
Figure 3:
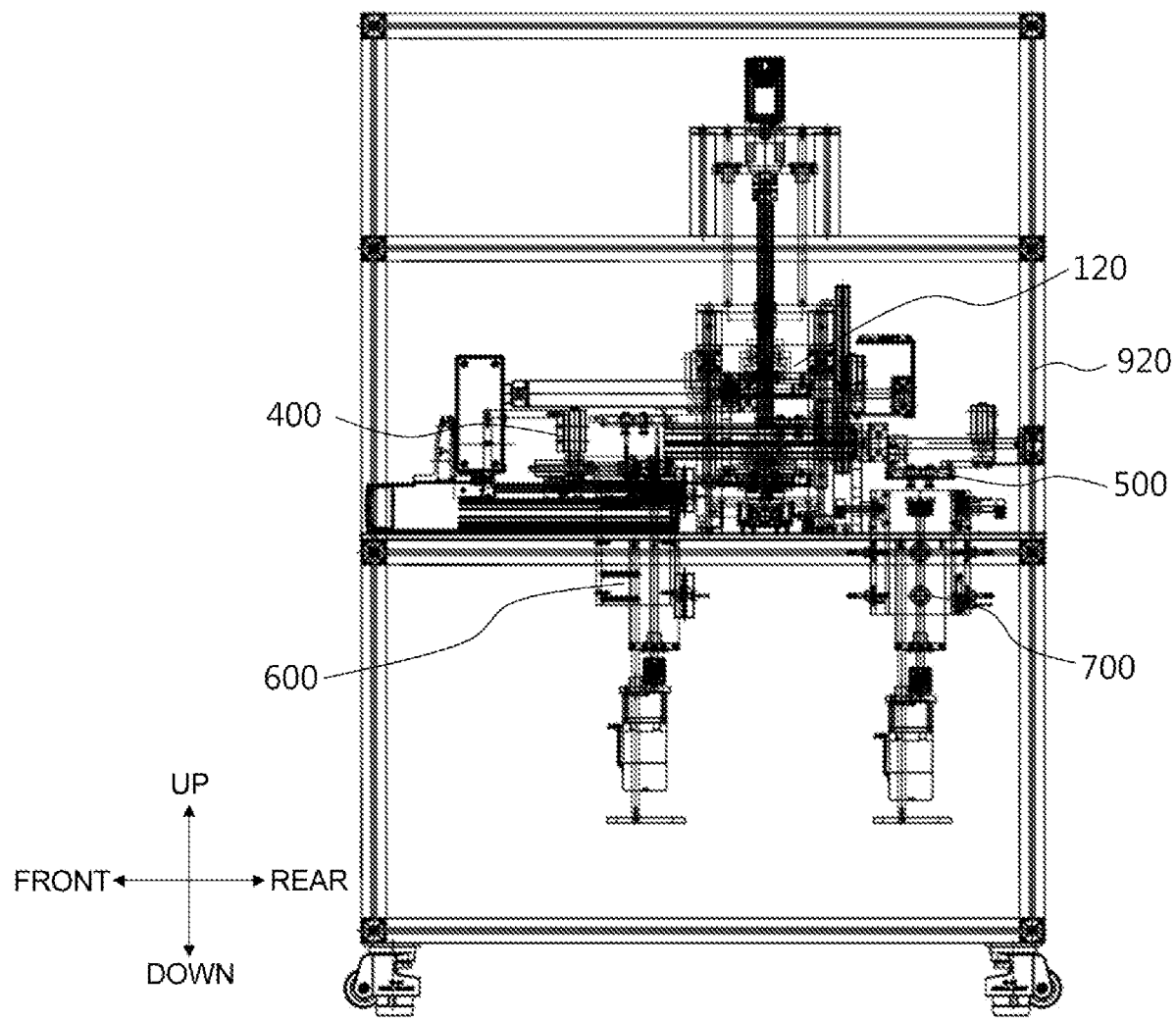
FIG. 3 is a right-side view of the manufacturing device according to the embodiment of the present invention.
Figure 4:
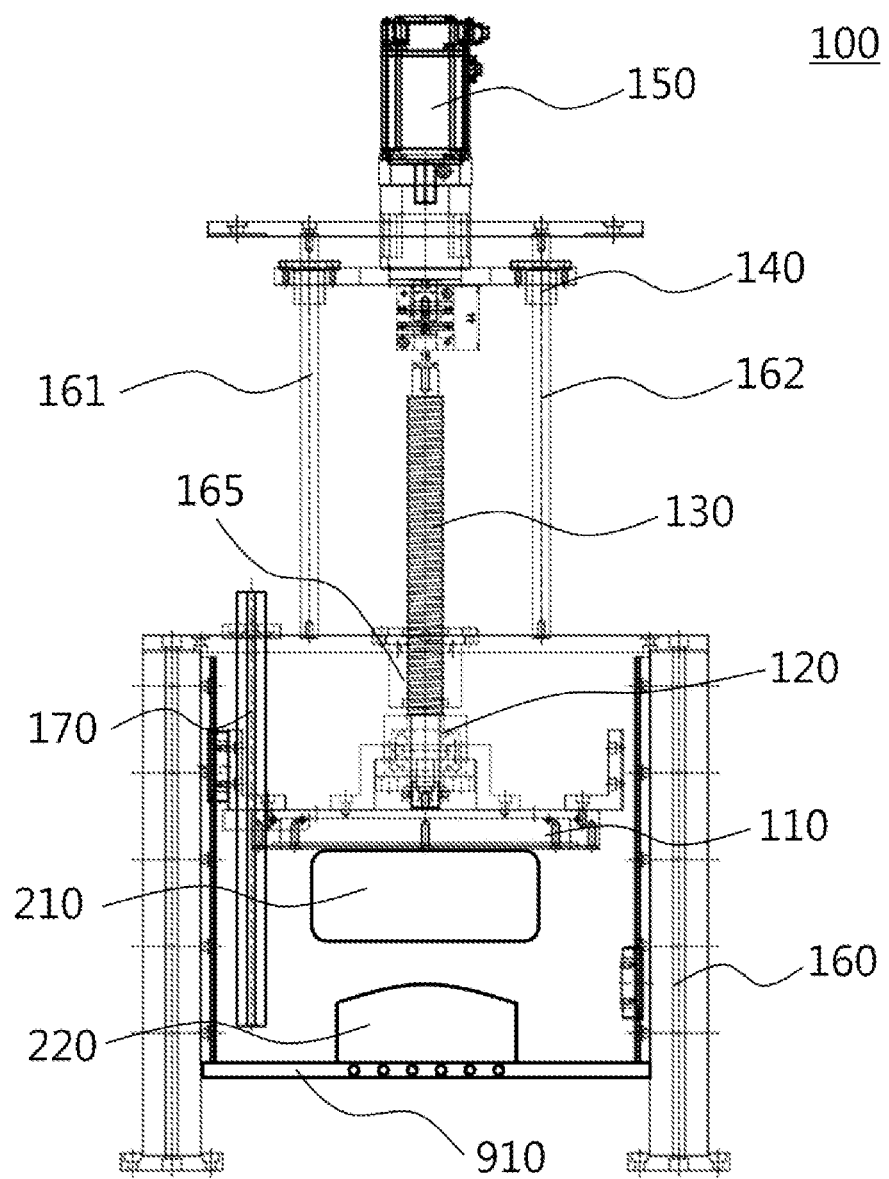
FIG. 4 is a front view of a press head unit according to the embodiment of the present invention.
Figure 5A:
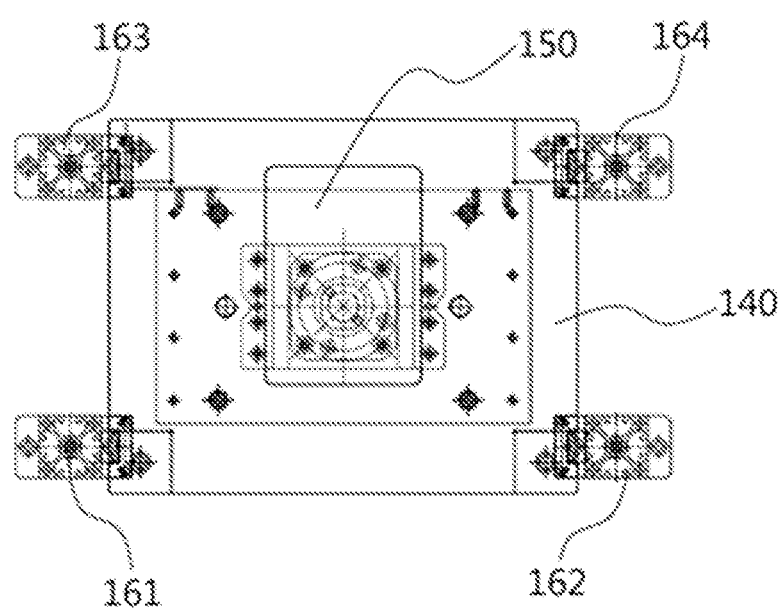
FIGS. 5A and 5B show a plan view and a right-side view of the press head unit according to the embodiment of the present invention.
Figure 5B:
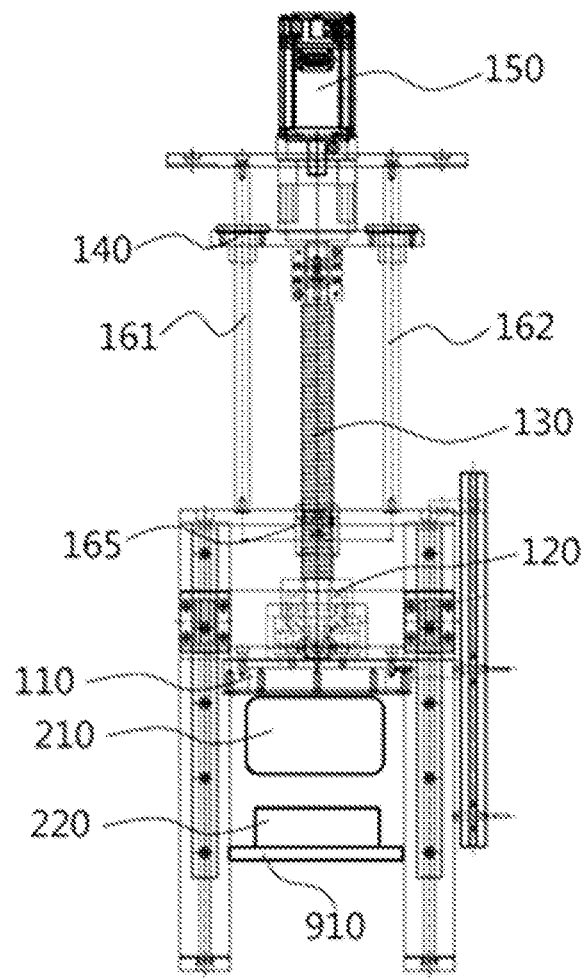

FIG. 1 is a front view of a manufacturing device according to an embodiment of the present invention. FIG. 2 is a plan view of the manufacturing device according to the embodiment of the present invention. FIG. 3 is a right-side view of the manufacturing device according to the embodiment of the present invention. FIG. 4 is a front view of a press head unit 100 according to the embodiment of the present invention. FIGS. 5A and 5B show a plan view and a right-side view of the press head unit 100 according to the embodiment of the present invention. Here, the plan view of the press head unit 100 is shown in FIG. 5A, and the right side-view of the press head unit 100 is shown in FIG. 5B.

As shown in FIGS. 1 to 5B, the manufacturing device according to the embodiment of the present invention includes: a mold 220 for molding a forming film; a press head unit 100 which is positioned to correspond to the mold 220 and has a variable spaced distance from the mold 220; and a variable volume body 210 which is coupled to the press head unit 100 and has elasticity so that a volume thereof is variable due to gas introduction and discharge by the press head unit 100. The variable volume body 210 comes into contact with the forming film positioned in the mold 220 in accordance with a volume change of the variable volume body 210. The variable volume body presses the forming film so that the forming film is mold in a 3D shape.

That is, in the case of most conventional general films, flat (flat plate-shaped) films have been mainly used, and press devices for processing such flat films have been molding the film by applying pressure in only one direction.

When using such conventional press devices, there is a problem that the 3D-shaped film cannot be molded. This is because the pressure surface of the press device is moved only in the up-and-down or the right-and-left direction so that the curved surface cannot be pressed. Particularly, it is not possible to mold such that the forming film for protecting the display of a mobile phone with a bent end, which has been widely being used recently, has a certain curvature.

However, in the device for manufacturing a 3D forming film, the separate variable volume body 210 is additionally attached to the end of the press head unit 100, which comes into contact with the mold 220, and gas is controlled to be introduced into or discharged from the variable volume body 210. Accordingly, as with a conventional press device, it is possible not only to manufacture a flat film by pressing the flat upper portion of the mold 220 but also to perform press processing on the 3D forming film with a bend end by the variable volume body 210 pressing the outside of the mold with a bent end.

A mold having separate curvatures according to the appearance of various mobile phones or displays is designed, and, regardless of the curvature of the bent end of the mold, the variable volume body 210 can press the mold while expanding. Therefore, the device for manufacturing a 3D forming film according to the embodiment of the present invention has an advantage of being freely used regardless of the mold or a target product.

A detailed configuration for manufacturing a 3D forming film according to the expansion and pressing of the variable volume body 210 will be described. The configuration further includes a height adjuster which is connected to one side of the mold 220 or the press head unit 100 and adjusts an up and down position of the mold 220 or the press head unit 100. It is possible to easily control the molding of the forming film in accordance with the operation of the height adjuster.

That is, the height adjuster adjusts only the up and down position of any one of the mold 220 or the press head unit 100 and then applies pressure to the forming film, or adjusts simultaneously the positions of both the mold 220 and the press head unit 100 and then applies pressure to the forming film. There is no need to be limited to any one of them.

In addition, the press head unit 100 may include a gas controller 120 which introduces gas received from the outside into the variable volume body 210 or discharges the gas inside the variable volume body 210. Here, the press head unit 100 may further include: a press frame 160; an up-and-down moving body 140 which is coupled to the press frame 160 and performs an up-and-down linear motion; a press motor 150 which is coupled to the up-and-down moving body 140; a screw shaft 130 which has an end thereof coupled to the press motor 150 and the other end thereof coupled to an upper portion of the gas controller 120 and is screw-coupled to the press frame 160 to perform a rotational motion and an up-and-down linear motion; and a press head 110 of which an upper portion thereof is coupled to the gas controller 120 and of which a lower portion thereof is coupled to the variable volume body 210.

Therefore, it is more preferable that the variable volume body 210 is formed such that it expands partially by introducing a portion of the gas before contacting the forming film and then contacts the forming film, and expands by introducing the remaining gas after contacting the forming film so that the mold and a curved portion of the forming film are pressed and 3D-molded.

The manufacturing device of the embodiment of the present invention may include a device frame part 920 which forms the outermost shape of the manufacturing device of the present invention. The press frame 160 may be coupled with the device frame unit 920 such that it is located upwardly from the center of the device frame unit 920. The press frame 160 may include a first guide shaft 161, a second guide shaft 162, a third guide shaft 163, and a fourth guide shaft 164 which are coupled with the up-and-down moving body 140 moving in the up and down direction and guide the up-and-down moving body 140. Here, the first to fourth guide shafts 161 to 164 may have a rod shape, but are not limited thereto.

The gas controller 120 is connected to a pump formed outside the manufacturing device according to the embodiment of the present invention, and the pump may press and supply gas to the gas controller 120 or provide a gas suction force to the gas controller 120. Here, the gas may be air, but is not limited thereto. Further, the gas controller 120 may include a gas control valve. When the pump presses and supplies gas to the gas controller 120, the gas control valve is opened and gas is introduced into the variable volume body 210, thereby increasing the volume of the variable volume body 210. Here, when the variable volume body 210 is changed to a preset volume, the gas control valve is closed to maintain the shape of the variable volume body 210 having the increased volume. Also, when the pump provides a gas suction force to the gas controller 120, the gas control valve is opened and the gas is discharged to the pump, so that the volume of the variable volume body 210 may be reduced.

The press head unit 100 may further include a screw guide body 165 that is fixedly coupled to the press frame 160 and has a female screw thread formed on an inner surface thereof. Here, the screw shaft 130 may have a male screw thread formed on the outer surface thereof, and the screw shaft 130 and the screw guide body 165 may be coupled. Also, the screw shaft 130 performs an up-and-down linear motion according to the rotation direction of the screw shaft 130 coupled with the press motor 150, and accordingly, the press motor 150 performs an up-and-down linear motion, so that the up-and-down moving body 140 coupled with the press motor 150 may perform an up-and-down linear motion. Also, according to the up-and-down linear motion of the screw shaft 130, the gas controller 120 and the press head 110 may perform an up-and-down linear motion.

The press head unit 100 may include a press head guide shaft 170 which is coupled to the press head 110 and guides the up-and-down linear motion of the press head 110. Accordingly, even when the screw shaft 130 rotates, the press head 110 and the gas controller 120 do not rotate and the press head 110 can perform an up-and-down linear motion along the press head guide shaft 170. Here, the other end of the screw shaft 130 coupled with the gas controller 120 has an outer surface of a curved surface without a male screw thread formed thereon, and the other end of the screw shaft 130 can perform a free rotation with respect to the gas controller 120.

The mold 220 is formed in a shape corresponding to the molding shape of the forming film, and may be formed of metal. The mold 220 is installed to be coupled to the press frame 160, and may be positioned to be spaced apart from the press head 110 under the press head 110.

The variable volume body 210 may be formed of a material having elasticity, and specifically, may be formed of natural rubber or a polymer material. In the embodiment of the present invention, it is described that the variable volume body 210 is formed of the above-mentioned material, but is not limited thereto, and may be formed of another material having elasticity. The variable volume body 210 having an increased volume may have a rectangular parallelepiped shape having a curved edge. Accordingly, a press process in which a bottom side of the variable volume body 210 having an increased volume comes into contact with the forming film and the variable volume body 210 presses the forming film on the mold 220 by the descent of the press head 110.

Figure 6A:
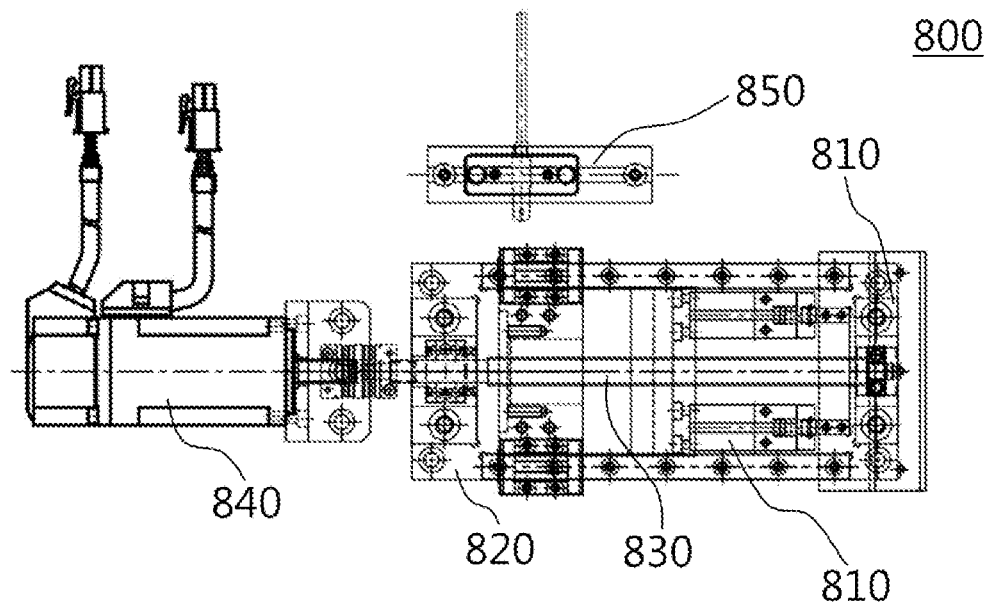
FIGS. 6A and 6B show a plan view and a front view of a clamp unit according to the embodiment of the present invention.
Figure 6B:
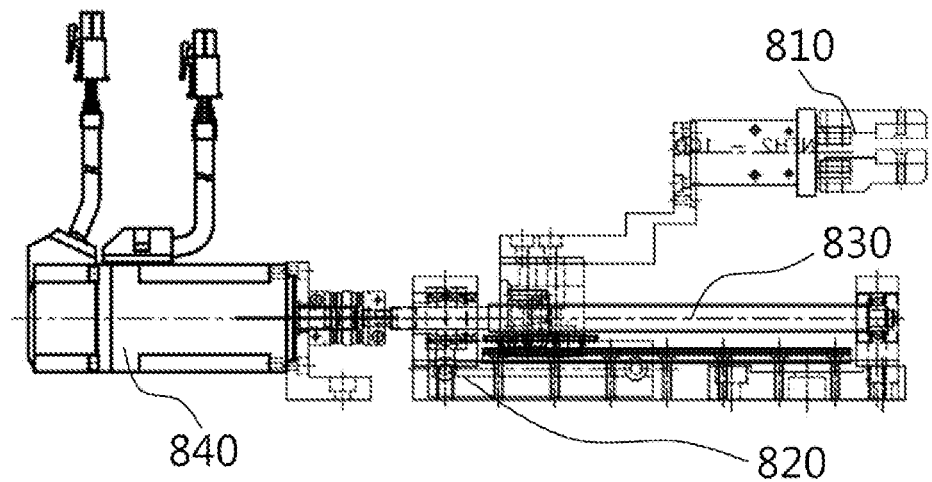

FIGS. 6A and 6B show a plan view and a front view of a clamp unit 800 according to the embodiment of the present invention. Here, the plan view of the clamp unit 800 is shown in FIG. 6A, and the front view of the clamp unit 800 is shown in FIG. 6B. As shown in FIGS. 6A and 6B, the manufacturing device according to the embodiment of the present invention may further include the clamp unit 800 which is installed adjacent to the mold 220 and fixes and supports the forming film when the forming film is positioned on the mold 220. The clamp unit 800 may include a tong-shaped clamp 810 which grips and fixes the forming film when the forming film is positioned on the mold 220, a clamp support 820 which is coupled to the clamp 810 and supports the clamp 810, a clamp screw shaft 830 which has a male screw thread formed on the outer surface thereof and is screw-coupled to the clamp support 820 having a female screw thread, a clamp motor 840 which is coupled with the clamp screw shaft 830 and performs a rotary motion, so that the clamp support 820 performs a left and right linear motion. The clamp motor 840 may be fixedly supported by being coupled with the device frame unit 920. Here, when the variable volume body 210 descends and comes into contact with the forming film on the mold 220 and then the forming film starts to be fixed by the variable volume body 210 and the mold 220, the clamp 810 may release the gripping of the forming film. Also, the clamp unit 800 may include a clamp sensor 850. The clamp sensor 850 may sense the position of the clamp 810. Accordingly, the position of the clamp 810 may be changed according to the position of the variable volume body 210. At least one clamp unit 800 may be formed.

Outside the manufacturing device according to the embodiment of the present invention, the forming film may be formed by punching a raw material film.

Figure 7:
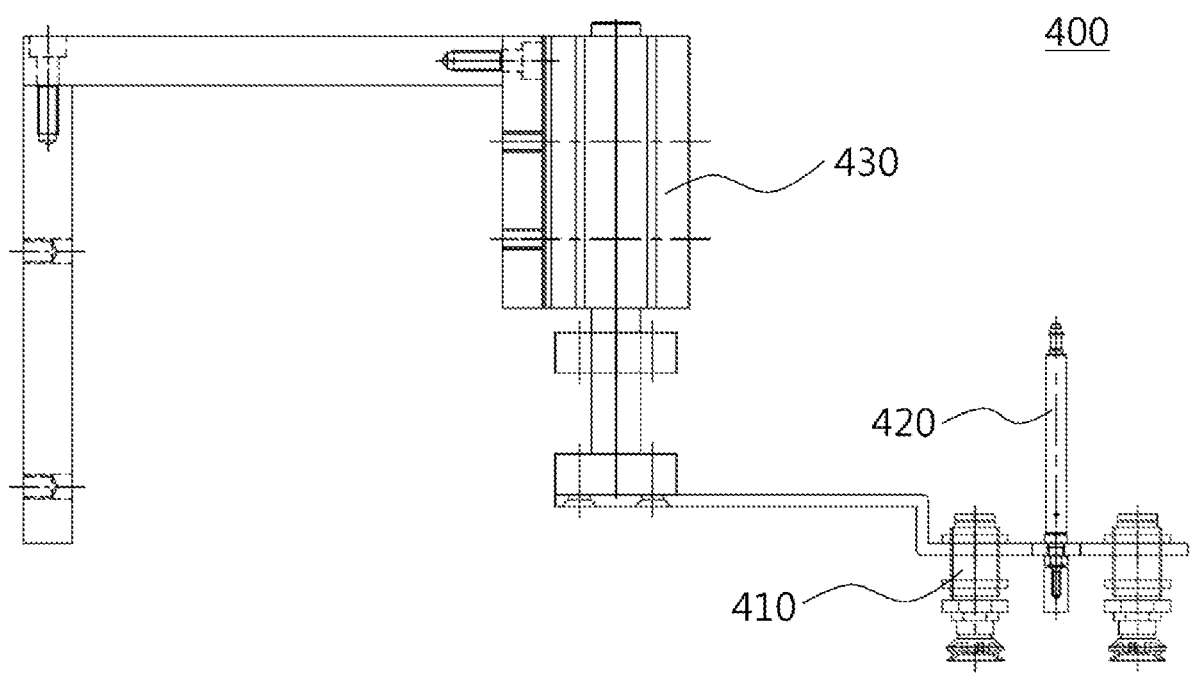
FIG. 7 is a right-side view of a pick-up unit according to the embodiment of the present invention.
Figure 8A:
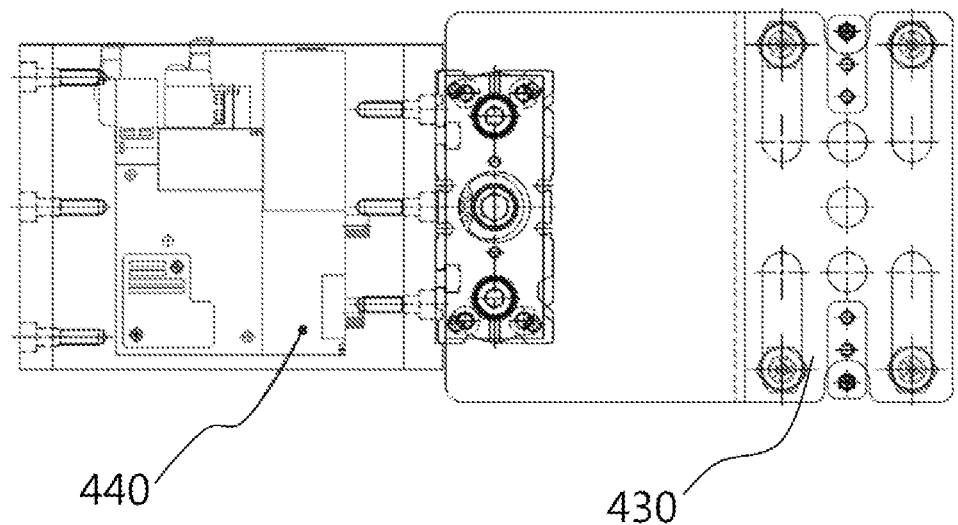
FIGS. 8A and 8B show a plan view and a front view of the pick-up unit according to the embodiment of the present invention.
Figure 8B:
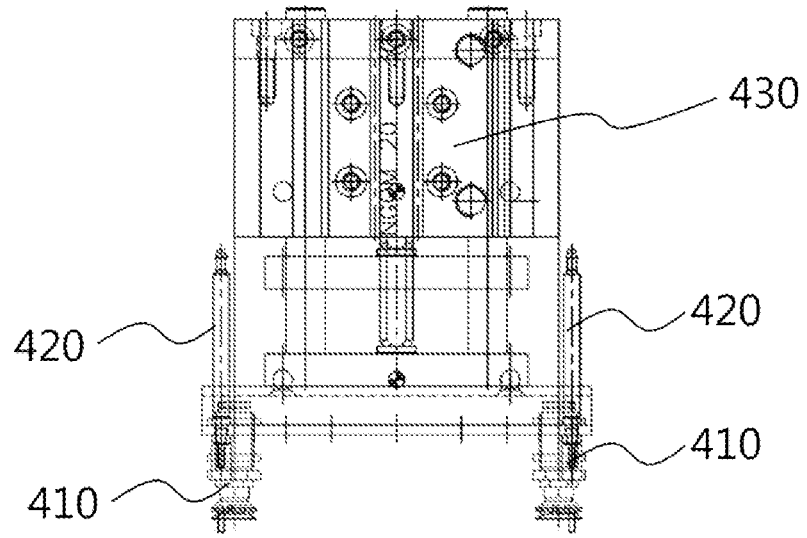

FIG. 7 is a right-side view of a pick-up unit 400 according to the embodiment of the present invention. FIGS. 8A and 8B show a plan view and a front view of the pick-up unit according to the embodiment of the present invention. Here, the plan view of the pick-up unit 400 is shown in FIG. 8A, and the front view of the pick-up unit 400 is shown in FIG. 8B. As shown in FIGS. 7, 8A and 8B, the manufacturing device according to the embodiment of the present invention may further include the pick-up unit 400 for transferring the forming film to a film alignment unit 300. The pick-up unit 400 may perform a left and right linear motion along a pick-up unit guide 921 formed in the device frame unit 920. The pick-up unit 400 may include a first pick-up part 410 which provides an adsorption force to the forming film and picks up the forming film; an attachable-detachable cylinder 420 which is coupled with the first pick-up part 410, has a variable length thereof, is adsorbed onto the first pick-up part 410 when the length increases, and attaches and detaches the picked up forming film by pushing the forming film; a first pick-up part transfer cylinder 430 which is coupled with the first pick-up part 410, has a variable length thereof, and causes the first pick-up part 410 to perform an up-and-down linear motion; and an ejector 440 which is coupled with the first pick-up part transfer cylinder 430 and provides an adsorption force to the first pick-up part 410. With the configuration as described above, the first pick-up part 410 performs an up and down and left and right linear motion, so that the forming film in a first collector 600 can be easily transferred to an adsorption bed 310 of the film alignment unit 300. Also, the first pick-up part 410 may adsorb and pick up the forming film from the adsorption bed 310 and transfer the forming film onto the mold 220.

Figure 9A:
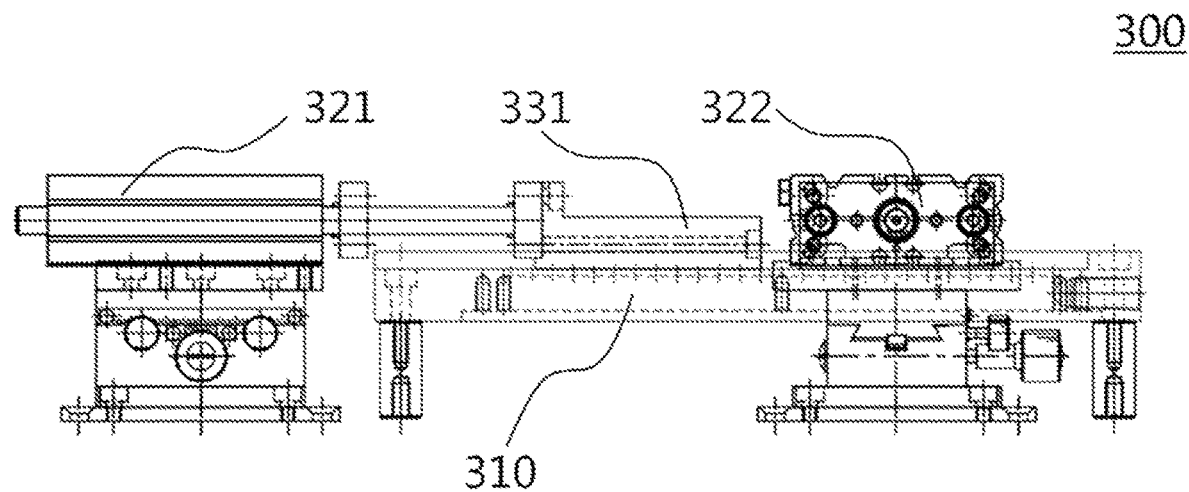
FIGS. 9A and 9B show a front view and a right-side view of a film alignment unit according to the embodiment of the present invention.
Figure 9B:
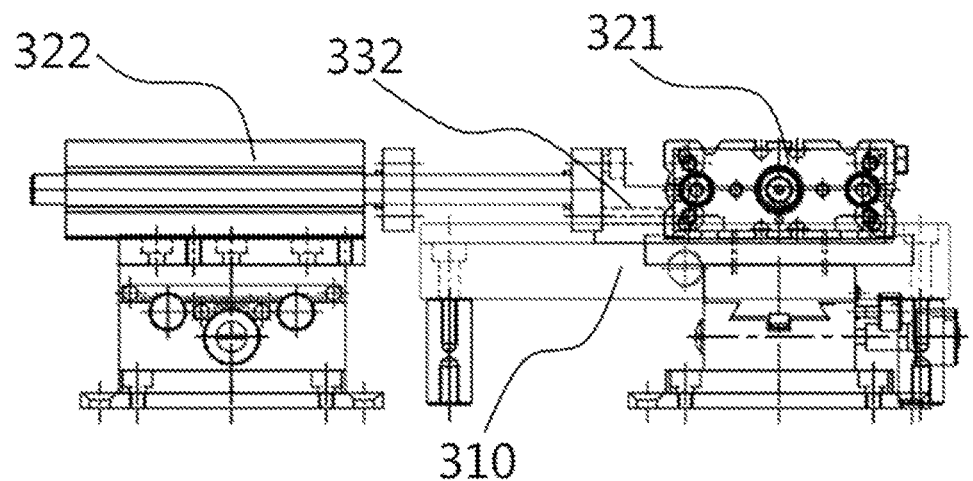
Figure 10:
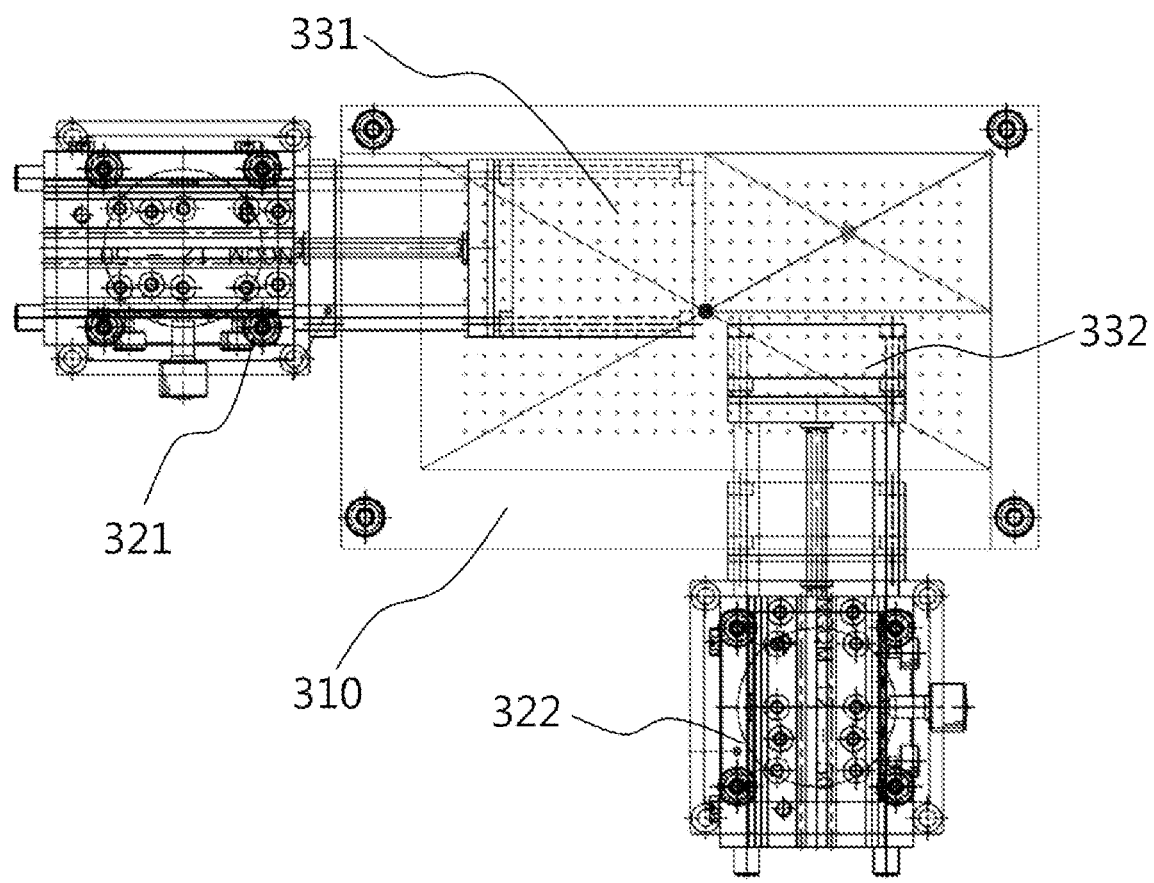
FIG. 10 is a front view of the film alignment unit according to the embodiment of the present invention.

FIGS. 9A and 9B show a front view and a right-side view of the film alignment unit 300 according to the embodiment of the present invention. FIG. 10 is a front view of the film alignment unit 300 according to the embodiment of the present invention. Here, the front view of the film alignment unit 300 is shown in FIG. 9A, and the right-side view of the film alignment unit 300 is shown in FIG. 9B. As shown in FIGS. 9A, 9B, and 10, the manufacturing device according to the embodiment of the present invention may include the adsorption bed 310 for fixing the forming film by using an adsorption force and may further include the film alignment unit 300 for aligning the forming film. The film alignment unit 300 may include: the adsorption bed 310 which provides an adsorption force to the forming film and supports the forming film; a first alignment cylinder 321 and a second alignment cylinder 322 which have variable lengths thereof; a first film alignment body 331 which is coupled with the first alignment cylinder 321, performs a left and right linear motion by varying the length of the first alignment cylinder 321, and aligns the forming film by pressing one side of the forming film; and a second film alignment body 332 which is coupled with the second alignment cylinder 322, performs a left and right linear motion by varying the length of the second alignment cylinder 322, and aligns the forming film by pressing the other side of the forming film. Here, the central axis of the first alignment cylinder 321 and the central axis of the second alignment cylinder 322 may be formed perpendicular to each other. Also, a lateral support supporting another side of the forming film which does not contact the first film alignment body 331 and the second film alignment body 332 may be formed.

Figure 11A:
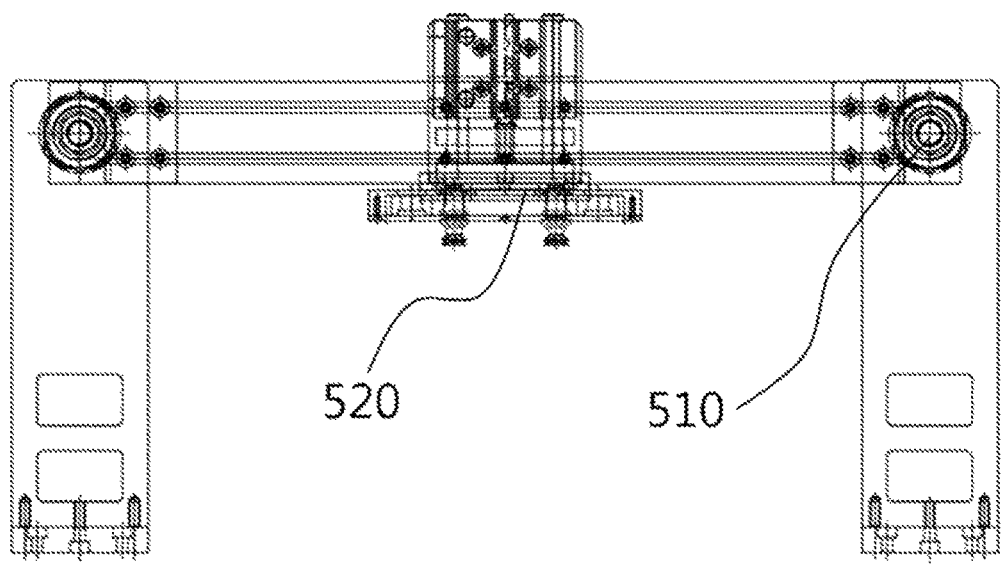
FIGS. 11A and 11B show a front view and a right-side view of a pick-up cooling unit according to the embodiment of the present invention.
Figure 11B:
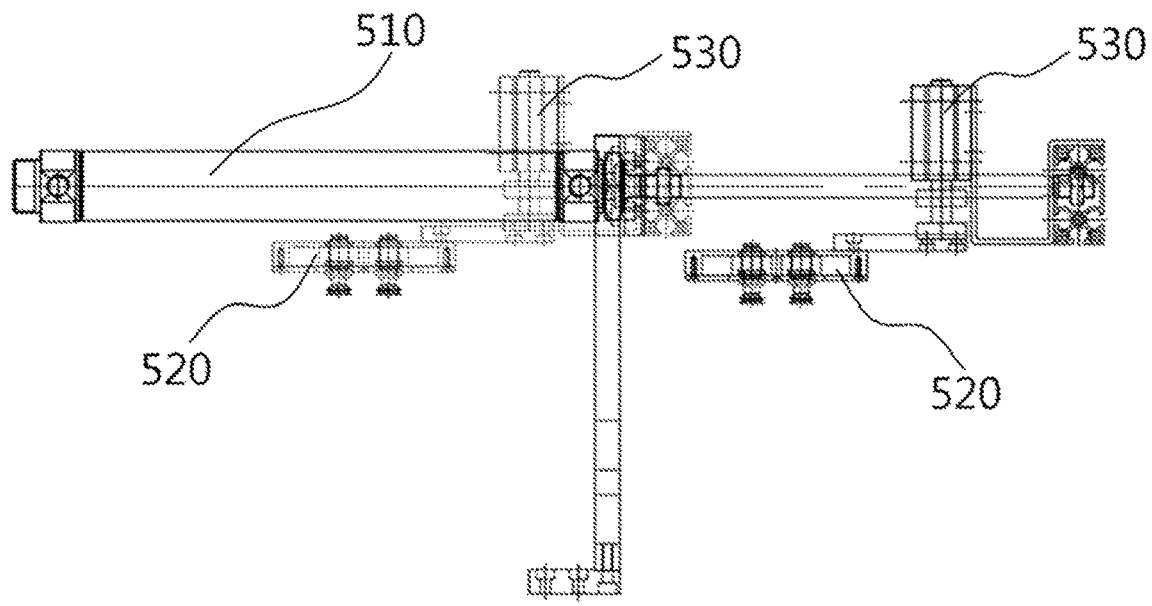
Figure 12:
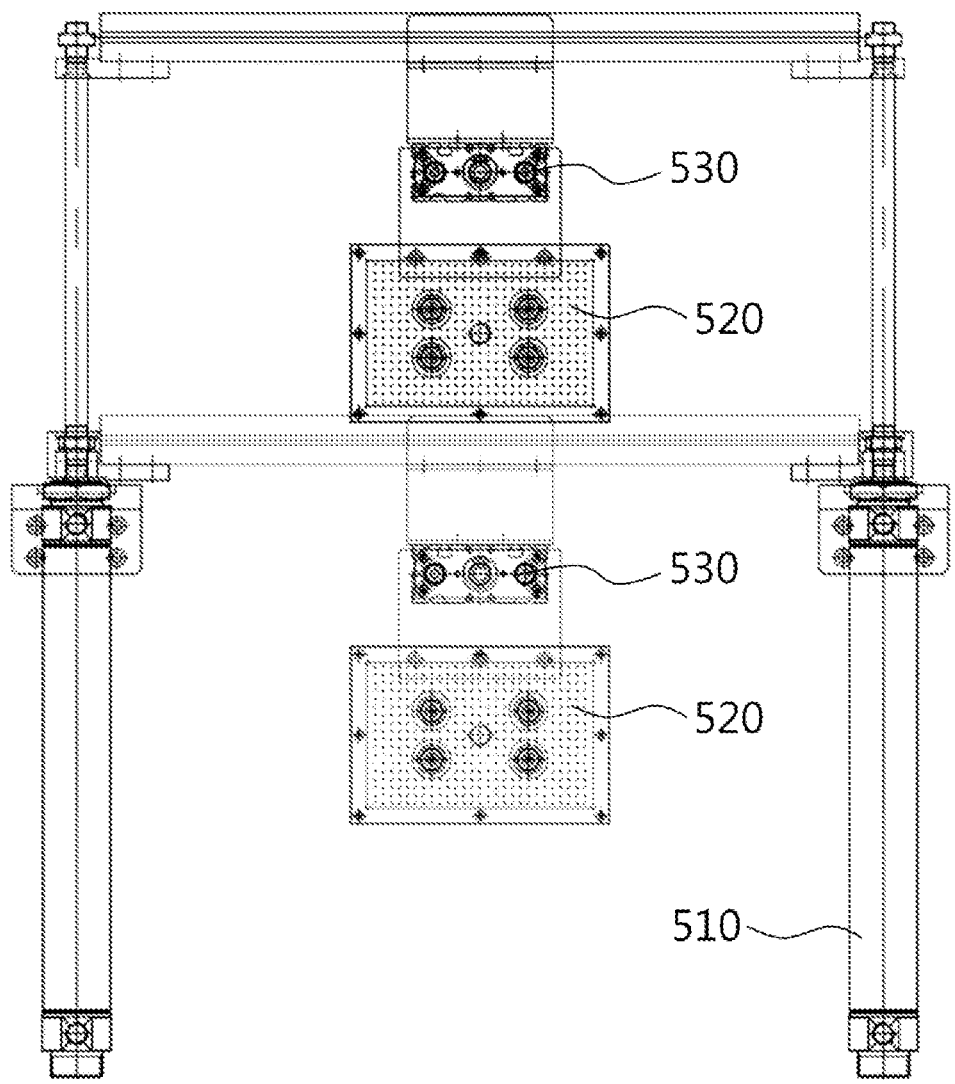
FIG. 12 is a plan view of the pick-up cooling unit according to the embodiment of the present invention.

FIGS. 11A and 11B show a front view and a right-side view of a pick-up cooling unit 500 according to the embodiment of the present invention. FIG. 12 is a plan view of the pick-up cooling unit 500 according to the embodiment of the present invention. The front view of the pick-up cooling unit 500 is shown in FIG. 11A, and the right-side view of the pick-up cooling unit 500 is shown in FIG. 11B. Here, it can be represented in FIG. 11B and FIG. 12 that a second pick-up part 520 performs a linear reciprocating motion in the forward and backward direction in accordance with the operation of a forward and backward transfer cylinder 510. The manufacturing device according to the embodiment of the present invention may further include the pick-up cooling unit 500 which transfers the forming film after molding and cools the forming film after molding in the mold 220. The pick-up cooling unit 500 may include: the forward and backward transfer cylinder 510 which is coupled with the device frame unit 920 and has a variable length thereof; and the second pick-up part 520 which is coupled with the forward and backward transfer cylinder 510, performs a forward and backward linear motion by varying the length of the forward and backward transfer cylinder 510, and transfers the formed forming film molded in a 3D shape by the mold 220 to a second collector 700. Also, the second pick-up part 520 may cool the 3D forming film molded by the mold 220.

Figure 13:
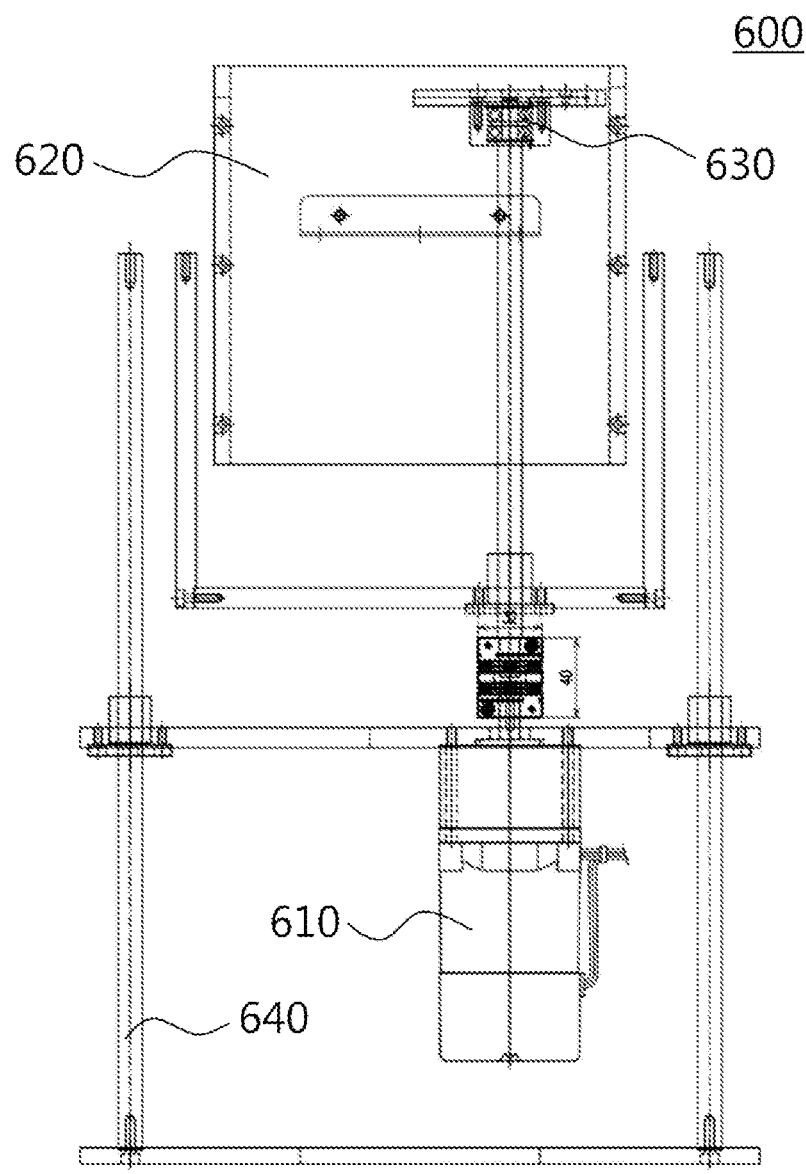
FIG. 13 is a front view of a first collector according to the embodiment of the present invention.
Figure 14A:
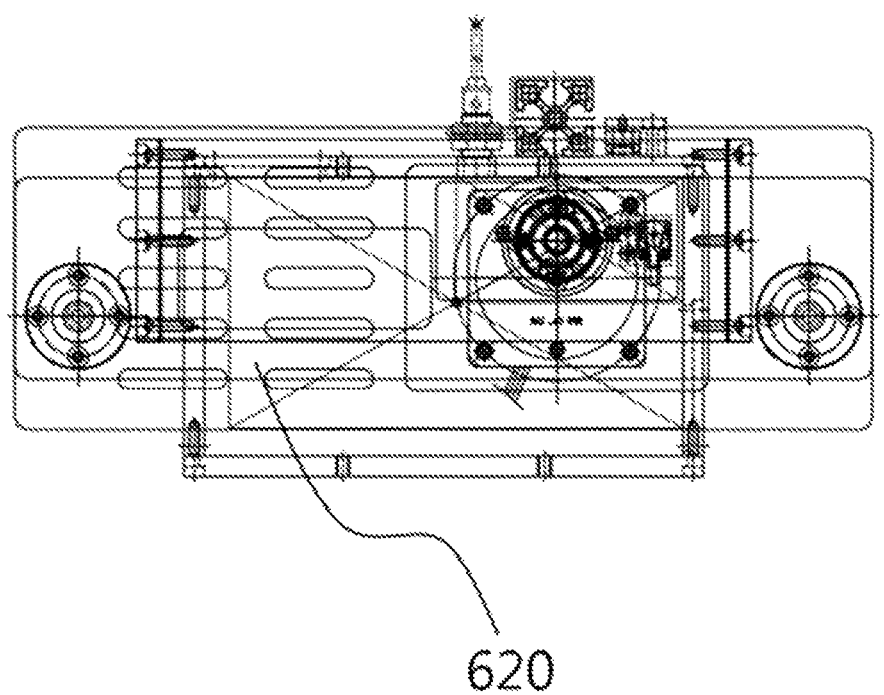
FIGS. 14A and 14B show a plan view and a right-side view of the first collector according to the embodiment of the present invention.
Figure 14B:
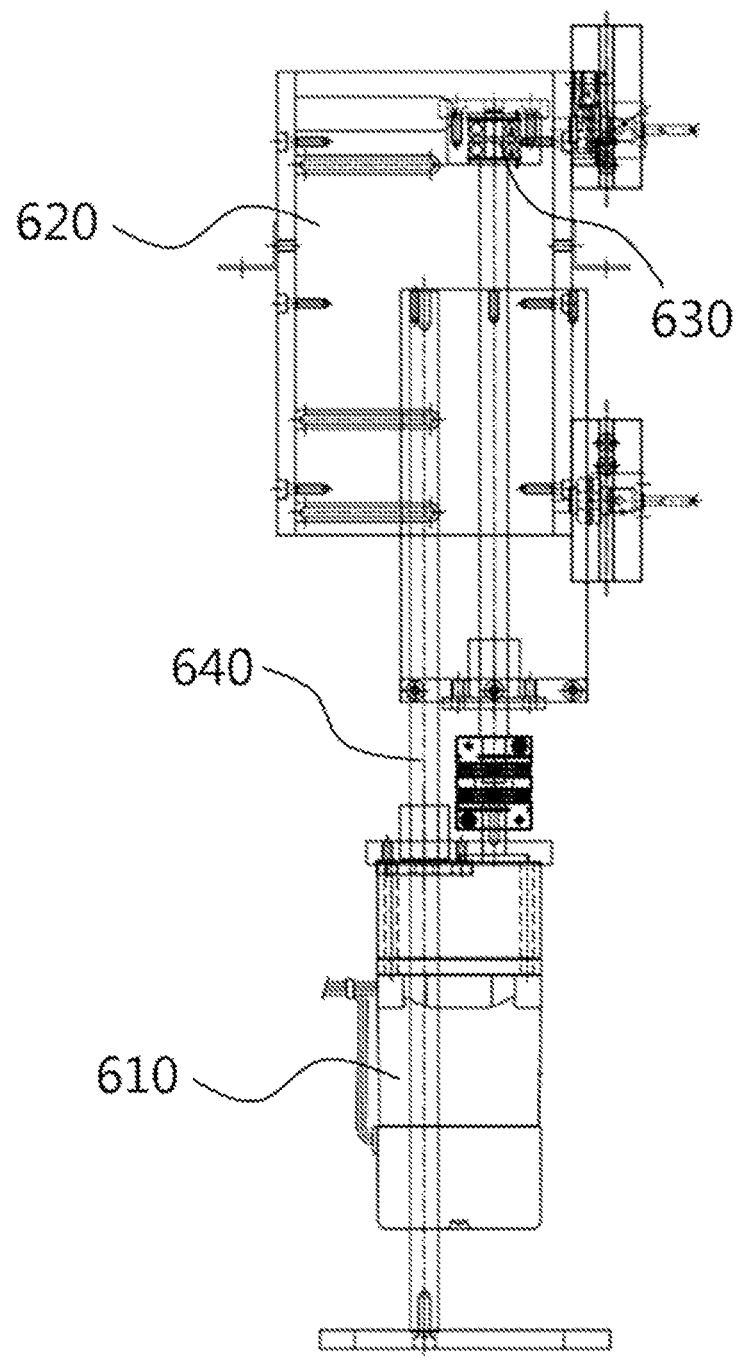

FIG. 13 is a front view of the first collector 600 according to the embodiment of the present invention. FIGS. 14A and 14B show a plan view and a right-side view of the first collector 600 according to the embodiment of the present invention. Here, the plan view of the first collector 600 is shown in FIG. 14A, and the right side-view of the first collector 600 is shown in FIG. 14B. As shown in FIGS. 13, 14A and 14B, the manufacturing device according to the embodiment of the present invention may further include the first collector 600 where the punched forming film is moved and collected. Also, the first collector 600 may include: a first collection frame 640; a first collection motor 610 which is coupled with the first collection frame 640; a first collection unit 620 which is coupled with the first collection motor 610 and performs an up-and-down linear motion by the driving of the first collection motor 610 and on which the punched forming film is loaded; and a first collection sensor 630 which determines whether the forming film is loaded in the first collection unit 620. Here, when the first collection sensor 630 senses that the punched forming film is loaded in the first collection unit 620, the first pick-up part 410 moves to the first collection unit 620 and adsorbs and picks up the forming film and then transfers the forming film to the adsorption bed 310, so that the forming film may be adsorbed onto the adsorption bed 310.

Figure 15:
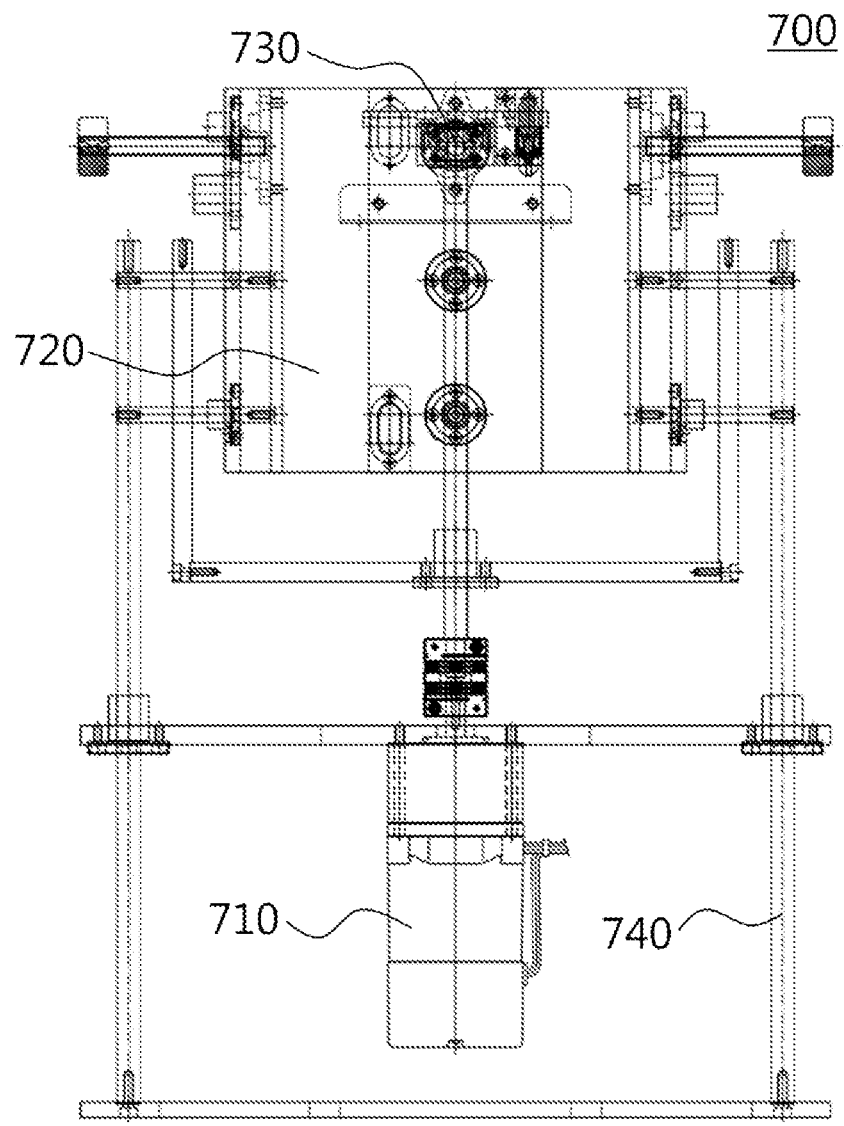
FIG. 15 is a front view of a second collector according to the embodiment of the present invention.
Figure 16A:
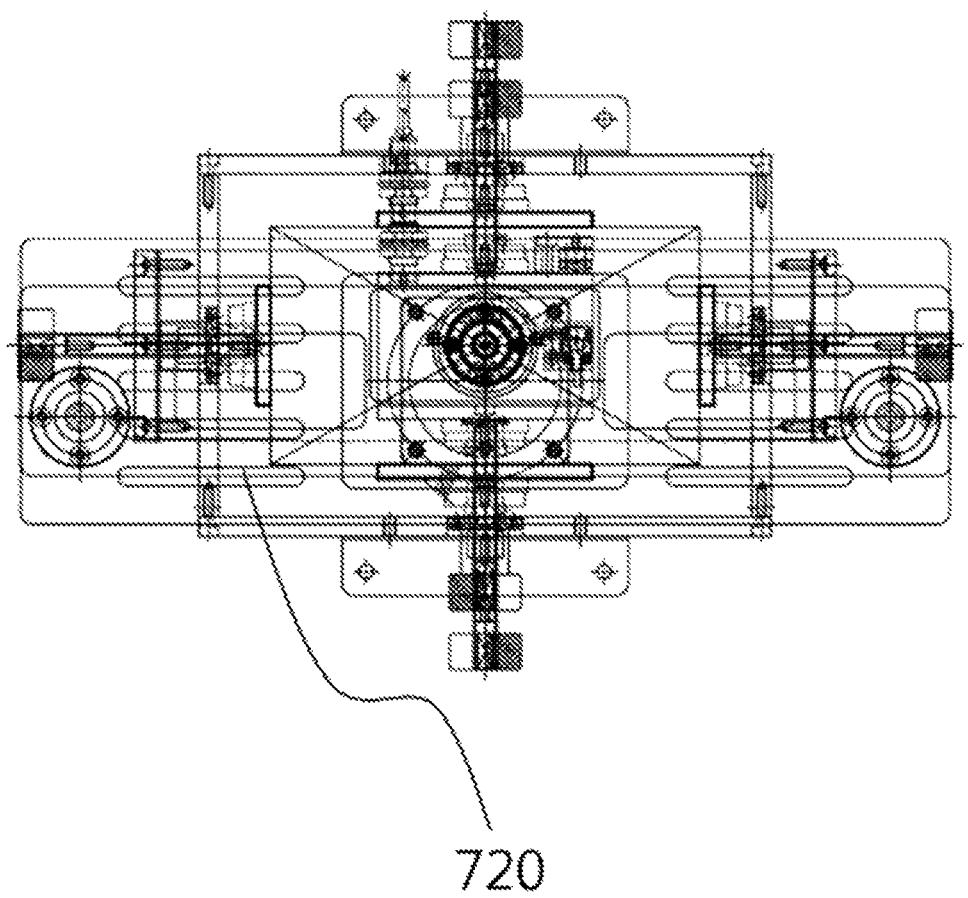
FIGS. 16A and 16B show a plan view and a right-side view of the second collector according to the embodiment of the present invention.
Figure 16B:
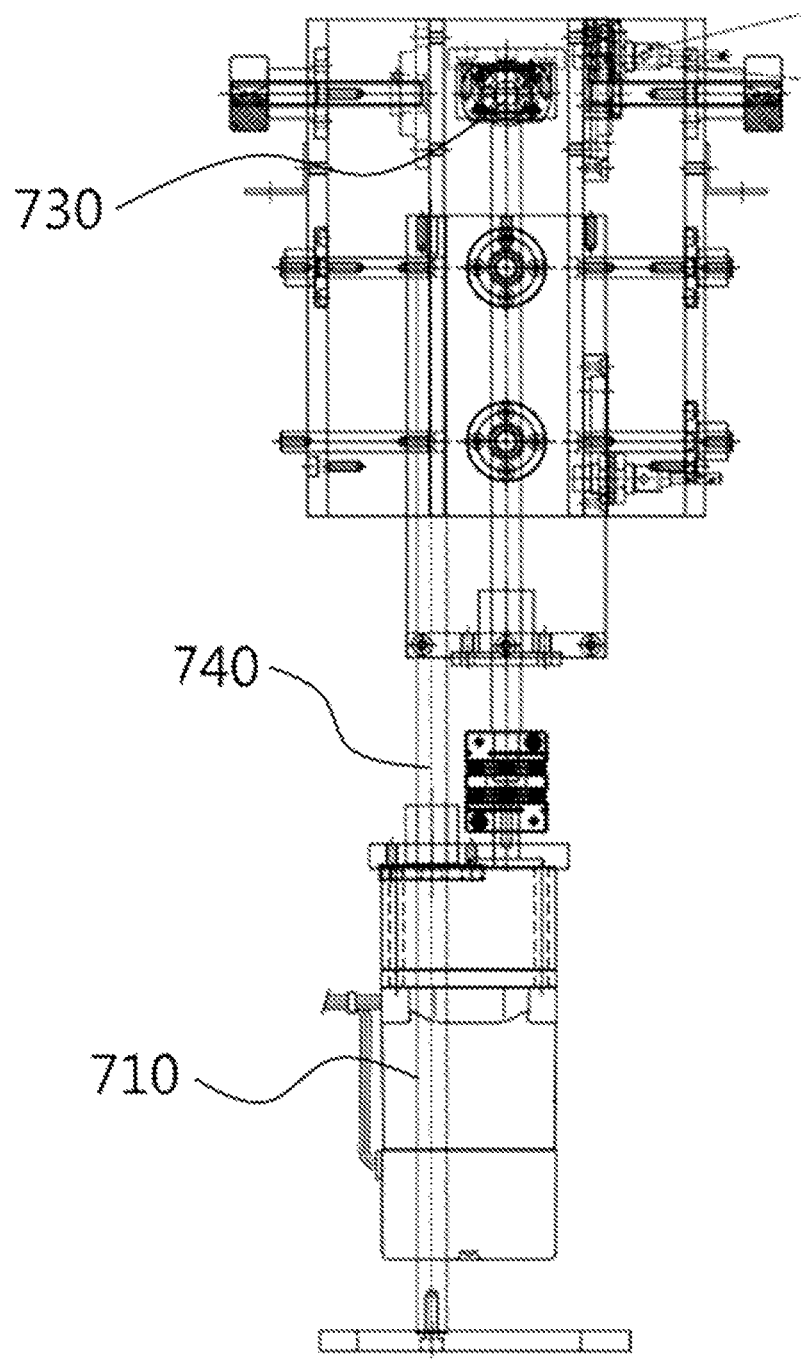

FIG. 15 is a front view of the collector according to the embodiment of the present invention. FIGS. 16A and 16B show a plan view and a right-side view of the collector according to the embodiment of the present invention. As shown in FIGS. 15, 16A and 16B, the manufacturing device according to the embodiment of the present invention may further include the second collector 700 where the forming film after molding is moved and collected. Also, the second collector 700 may include: a second collection frame 740; a second collection motor 710 which is coupled with the second collection frame 740; a second collection unit 720 which is coupled with the second collection motor 710 and performs an up-and-down linear motion by the driving of the second collection motor 710 and on which the forming film after molding is loaded; and a second collection sensor 730 which determines whether the forming film after molding is loaded in the second collection unit 720. Here, when the second collection sensor 730 senses that the forming film after molding is loaded in the second collection unit 720, the completion of the forming film may be visually or audibly displayed by an alarm.

As described above, each cylinder or motor causes a component coupled to each cylinder or motor to linearly move in up-and-down and the right-and-left directions or in the forward and backward direction. Accordingly, the forming film can be transferred in each of the three-dimensional directions.

The manufacturing device according to the embodiment of the present invention may further include a heating unit 910 which is located under the mold 220 and heats the mold 220. The heating unit 910 may be coupled with a lower portion of the press frame 160 and heat the mold 220 in the lower portion of the mold 220. The heating unit 910 may be formed of a plurality of heating wires, and heat energy can be generated by electrifying the plurality of heating wires.

Hereinafter, a method for molding the 3D forming film by using the manufacturing device according to the embodiment of the present invention will be described.

In a first step, a 3D shape data for a production target is provided, and the 3D shape data may be changed into a 2D data.

In a second step, the forming film formed by punching a raw material film by the 2D data may be transferred from the first collector 600 to the adsorption bed 310 by the first pick-up part 410.

In a third step, the forming film on the adsorption bed may be aligned by the film alignment unit.

In a fourth step, the forming film may be transferred onto the mold 220 by the first pick-up part 410.

In a fifth step, the volume of the variable volume body 210 increases and the press head 110 descends, and then the variable volume body 210 presses the forming film on the mold 220 heated by the heating unit 910, so that the forming film may be molded.

In a sixth step, the head press 110 ascends while the volume of the variable volume body 210 decreases and then the second pick-up part 520 moves onto the mold 220, so that the forming film after molding may be cooled.

In a seventh step, the second pick-up part 520 may move the forming film after molding from the mold 220 to the second collector 700.

The above descriptions of the embodiment of the present invention are illustrative only. It can be understood by those skilled in the art that the embodiments can be embodied in other specific forms without departing from its spirit or essential characteristics. Therefore, the foregoing embodiments and advantages are merely exemplary and are not to be construed as limiting the present invention. For example, each component described as a single type may be embodied

| REFERENCE NUMERALS | | | |
|---|---|---|---|
| 100: | press head unit | 110: | press head |
| 120: | gas controller | 130: | screw shaft |
| 140: | vertical moving body | 150: | press motor |
| 160: | press frame | 161: | first guide shaft |
| 162: | second guide shaft | 163: | third guide shaft |
| 164: | fourth guide shaft | 165: | screw guide body |
| 170: | press head guide shaft | 210: | variable volume body |
| 220: | mold | 300: | film alignment unit |
| 310: | adsorption bed | 321: | first alignment cylinder |
| 322: | second alignment cylinder | 331: | first film alignment body |
| 332: | second film alignment body | 400: | pick-up unit |
| 410: | first pick-up part | 420: | attachable-detachable cylinder |
| 430: | first pick-up part transfer cylinder | 440: | ejector |
| 500: | pick-up cooling unit | 510: | forward and backward transfer cylinder |
| 520: | second pick-up part | 530: | second pick-up part transfer cylinder |
| 600: | first collector | | |
| 620: | first collection unit | 610: | first collection motor |
| 640: | first collection frame | 630: | first collection sensor |
| 710: | second collection motor | 700: | second collector |
| 730: | second collection sensor | 720: | second collection unit |
| 800: | clamp unit | 740: | second collection frame |
| 820: | clamp support | 810: | clamp |
| 840: | clamp motor | 830: | clamp screw shaft |
| 910: | heating unit | 850: | clamp sensor |
| 921: | pick-up unit guide | 920: | device frame unit |

What is claimed is:

1. A device for manufacturing a 3D forming film with a mold, the device comprising:
a press head unit positioned to be distanced from the mold; and
a variable volume body coupled to the press head unit and having elasticity so that a volume thereof is variable due to gas introduction and discharge,
wherein the variable volume body is configured to be in contact with a forming film positioned in or on the mold in accordance with a volume change of the variable volume body,
wherein the variable volume body is configured to press the forming film so that the forming film is molded in a 3D shape,
wherein the press head unit comprises:
a press frame;
an up-and-down moving body coupled to the press frame and configured to move linearly up and down;
a press motor coupled to the up-and-down moving body;
a press head having a lower portion on which the variable volume body is mounted;
a screw shaft having a first end connected to the press motor and a second end screw-coupled to the press frame to perform a rotational motion and an up-and-down linear motion,
wherein the press head unit includes a press head guide shaft which is coupled to the press head and guides an up-and-down linear motion of the press head such that when the screw shaft rotates, the press head does not rotate but move linearly up and down along the press head guide shaft.

2. The device of claim 1, wherein the press head unit further comprises a gas controller configured to cause gas transferred from an outside to be introduced into the variable volume body or to cause gas inside the variable volume body to be discharged.

3. The device of claim 1, further comprising a film alignment unit configured to align the forming film,
wherein the film alignment unit includes:
an adsorption bed providing an adsorption force to the forming film and supporting the forming film;
an alignment cylinder having a variable length; and
a film alignment body coupled with the alignment cylinder and performing a linear motion by varying the length of the alignment cylinder to align the forming film by pressing one side of the forming film.

4. The device of claim 3, further comprising a pick-up unit configured to transfer the forming film to the film alignment unit,
wherein the pick-up unit includes:
a pick-up part which provides an adsorption force to the forming film and picks up the forming film;
an attachable-detachable cylinder which is coupled with the pick-up part, has a variable length thereof, is adsorbed onto the pick-up part when the length increases, and attaches and detaches the forming film by pushing the forming film;
a pick-up part transfer cylinder which is coupled with the pick-up part, has a variable length thereof, and causes the pick-up part to perform an up-and-down linear motion; and
an ejector which is coupled with the pick-up part transfer cylinder and provides an adsorption force to the pick-up part.

5. The device of claim 1, further comprising a pick-up cooling unit configured to transfer the forming film after molding and cools the forming film after molding in the mold,
wherein the pick-up cooling unit includes:
a forward and backward transfer cylinder which is coupled with a device frame unit and has a variable length thereof; and
a pick-up part which is coupled with the forward and backward transfer cylinder, performs a forward and backward linear motion by varying the length of the forward and backward transfer cylinder, and transfers the forming film molded in the 3D shape by the mold.

6. The device of claim 1, further comprising a first collector where the forming film is moved and collected,
wherein the first collector includes:
a first collection frame;
a first collection motor which is coupled with the first collection frame;
a first collection unit which is coupled with the first collection motor and performs an up-and-down linear motion by a driving of the first collection motor and on which the forming film is loaded; and
a first collection sensor which determines whether the forming film is loaded in the first collection unit.

7. The device of claim 6, further comprising a second collector where the forming film after molding is moved and collected,
wherein the second collector includes:
a second collection frame;
a second collection motor which is coupled with the second collection frame;
a second collection unit which is coupled with the second collection motor and performs an up-and-down linear motion by a driving of the second collection motor and on which the forming film after molding is loaded; and a second collection sensor which determines whether the forming film after molding is loaded in the second collection unit.

8. The device of claim 1, further comprising a clamp unit which is installed adjacent to the mold and fixes and supports the forming film when the forming film is located in the mold.

9. The device of claim 1, further comprising a heating unit which is located under the mold and heats the mold.

10. The device of claim 1, further comprising a height adjuster which is connected to one side of the mold or the press head unit and adjusts an up and down position of the mold or the press head unit.

11. The device of claim 10, wherein the height adjuster applies pressure to the forming film by adjusting only the up and down position of one of the mold and the press head unit.

12. The device of claim 10, wherein the height adjuster applies pressure to the forming film by adjusting the up and down positions of both the mold and the press head unit.

13. The device of claim 1, wherein the variable volume body is formed such that it expands partially by introducing a portion of the gas before contacting the forming film and then contacts the forming film, and expands by introducing the remaining gas after contacting the forming film so that the mold and a curved portion of the forming film are pressed and 3D-molded.

* * * * *